(12) United States Patent
Kurohata

(10) Patent No.: US 6,612,951 B2
(45) Date of Patent: Sep. 2, 2003

(54) RATCHET TENSIONER WITH MECHANISM FOR LOCKING AND RELEASING A PLUNGER

(75) Inventor: Junya Kurohata, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/767,087

(22) Filed: Jan. 22, 2001

(65) Prior Publication Data

US 2001/0009877 A1 Jul. 26, 2001

(30) Foreign Application Priority Data

Jan. 21, 2000 (JP) ........................................ 2000-013077

(51) Int. Cl.[7] ................................................ F16H 7/08
(52) U.S. Cl. ........................................ 474/109; 474/110
(58) Field of Search ................................ 474/110, 109, 474/138, 111, 101, 136, 113, 140, 117

(56) References Cited

U.S. PATENT DOCUMENTS

| | | | | |
|---|---|---|---|---|
| 3,812,733 A | * | 5/1974 | Yoshida | 474/111 |
| 4,881,927 A | * | 11/1989 | Suzuki | 474/110 |
| 5,601,505 A | * | 2/1997 | Tada | 474/110 |
| 6,120,402 A | * | 9/2000 | Preston et al. | 474/109 |
| 6,244,981 B1 | * | 6/2001 | Simpson | 474/110 |

FOREIGN PATENT DOCUMENTS

| | | | |
|---|---|---|---|
| JP | 10-12165 | | 1/1989 |
| JP | 6-174019 | * | 6/1994 |
| JP | 6-193696 | * | 7/1994 |
| JP | 10-2386 | | 6/1998 |
| JP | 11-344086 | | 12/1999 |

* cited by examiner

Primary Examiner—Marcus Charles
(74) Attorney, Agent, or Firm—Dann, Dorfman, Herrell and Skillman; Henry H. Skillman

(57) ABSTRACT

A ratchet tensioner includes a mechanism for selectively locking and releasing a plunger with respect to a ratchet pawl. The plunger locking and releasing mechanism has an actuator plate secured to the shaft of a ratchet pawl body for co-rotation therewith above the outside surface of a housing shaft in which a pin-accommodating hole is formed. The actuator plate has a pin-insertion hole smaller in diameter than the pin-accommodating hole and is manually movable about the axis of the shaft in opposite directions between a locking position in which the pin-insertion hole is in substantial alignment with the pin-accommodating hole and the engagement between a ratchet pawl and ratchet teeth on the plunger is maintained, and a releasing position in which the pin-insertion hole is out of alignment with the pin-accommodating hole, and the ratchet pawl is released from interlocking engagement with the ratchet teeth against the force of a ratchet pawl spring. A stopper pin is removably inserted into the pin-accommodating hole either through the pin-insertion hole to keep the actuator plate in the locking position, or alternatively directly, with an outer edge of the actuator plate being in contact with the stopper pin, to keep the actuator plate in the releasing position.

2 Claims, 5 Drawing Sheets

RATCHET TENSIONER WITH MECHANISM FOR LOCKING AND RELEASING A PLUNGER

BACKGROUND OF THE INVENTION

1. Field of the Invention

The present invention relates to a ratchet tensioner used to provide an appropriate tension to a timing belt or a timing chain of a vehicle engine, and more particularly to a ratchet tensioner having a mechanism for locking and releasing a plunger.

2. Description of the Related Art

The ratchet tensioner has been widely used for suppressing vibrations generated when a timing belt or a timing chain is traveling to transmit rotation between a crankshaft and a camshaft of an engine, and for maintaining an appropriate tension in the timing belt or chain. Such ratchet tensioner is constructed such that a plunger protruding from a housing of the tensioner presses the rear side of a free end portion of a tensioner lever pivotally mounted to a body of the engine, so that a shoe surface of the tensioner lever slidably contacts with a slack side of the chain to give an appropriate tension to the chain (see Japanese Patent Publication No. HEI-3-8415, Japanese Patent Laid-Open Publication No. HEI-10-2386, and Japanese Patent Laid-Open Publication No. HEI-11-344086).

A typical example of the known ratchet tensioners is shown in FIGS. 5 and 6. The tensioner 31 includes a housing 32, a plunger 33 slidably mounted in the housing 32 and urged by a plunger spring 36 so that one end 33A of the plunger 33 projects outward from the front surface of the housing 32. The tensioner 31 further has a ratchet pawl body 34 pivotally mounted by a shaft 34A to the housing 32 and urged by a ratchet pawl spring 38. The ratchet pawl body 34 has a ratchet pawl 34B engaged with a ratchet tooth 33B formed on a side surface of outer periphery of the plunger, so that a backward displacement of the plunger 33 is suppressed.

The ratchet tensioner 31 includes a buffer mechanism using a flow resistance of oil, and a backlash is maintained between the ratchet tooth 33B and the ratchet pawl 34B, so that the oil (not shown) is introduced into the interior of the plunger 33 from an external oil pump operating in synchronism with the engine via a check valve mechanism 35. When the plunger 33 receives shock from the tensioner lever, the plunger 33 is retracted against the force of a plunger spring 36 within a range of the backlash in a state that the ratchet tooth 33B and the ratchet pawl 34B are engaged. At that time, the check valve mechanism 35 is closed to leak the oil in the plunger 33 from between the outer peripheral surface of the plunger 33 and the inner peripheral surface of a plunger-accommodating hole of the housing 32, so that a shock force is relieved. Furthermore, reference numeral 32B in FIGS. 5 and 6 indicates a mounting hole for mounting the ratchet tensioner 31 to the engine body.

Additionally, the ratchet tensioner 31 comprises a plate 37 secured to an end of the shaft 34A of the ratchet pawl body projecting outside the housing 32. When the ratchet tensioner 31 is shipped or to be mounted to the engine, as shown in FIGS. 7 and 8, a stopper pin 39 is inserted into a pin inserting hole 37A of the plate 37 to contact with an outer wall end surface 32A of the housing 32 in a state that the ratchet tooth 33B and the ratchet pawl 34B are engaged, and thus the plunger 33 is retained so as not to fly out from the housing 32. In this case, after mounting the ratchet tensioner 31 to the engine, the stopper pin 39 is removed to place the tensioner 31 in an operating condition.

Furthermore, as other means for holding the plunger 33 in position against movement in the projecting direction when shipping the ratchet tensioner, as shown in FIGS. 9 and 10, the ratchet pawl body 34 is rotated by the rotation of the outer plate 37 to engage the ratchet tooth 33B with the ratchet pawl 34B, and then the stopper pin 39 is inserted through the pin inserting hole 37A of the outer plate 37 into a stopper hole 32C formed in the housing 32.

In the ratchet tensioner, it is necessary to pull in the plunger 33 that has been projected in case of repairing the engine, removing or mounting the chain. However, the prior ratchet tensioner has problems that the plunger 33 cannot be pushed simply into the interior of the housing, and the work for removing or mounting the chain cannot be performed simply, since the outer plate 37 is rotated to rotate the ratchet pawl body 34 so that it is possible to release the engagement of the plunger 33 serving as one-way mechanism, but there is not a mechanism for maintaining the state in that the engagement is released. Furthermore, it is difficult to insert a driver from a small window hole such as an engine service hole etc., for rotating the outer plate, and it is not capable of maintaining the disengagement state of the plunger.

SUMMARY OF THE INVENTION

Therefore, in view of the aforementioned problems, an object of the present invention is to provide a ratchet tensioner including a plunger locking and releasing mechanism which is capable of holding a plunger selectively in a locking position where a ratchet pawl on the ratchet pawl body is in interlocking engagement with ratchet teeth on the plunger, and in a releasing position in which the ratchet pawl is disengaged from the ratchet teeth.

To accomplish the above object, according to the present invention, there is provided a ratchet tensioner comprising: a housing; a plunger retractably mounted in the housing with one end projecting outward from the housing, the plunger having a series of ratchet teeth formed on an outer peripheral surface thereof; a plunger spring acting between the housing and the plunger and urging the plunger in a direction to project outward from the housing; a ratchet pawl body pivotally mounted by a shaft to the housing, the ratchet pawl body having a ratchet pawl formed at one end of the ratchet pawl body; a ratchet pawl spring acting between the housing and the ratchet pawl body and urging the ratchet pawl body to turn about the axis of the shaft in a direction to engage the rachet pawl with the ratchet teeth on the plunger, thereby preventing the plunger from moving backward; and a plunger locking and releasing mechanism for selectively locking and releasing the plunger with respect to the ratchet pawl.

The plunger locking and releasing mechanism has a pin-accommodating hole formed in an outside surface of the housing, an actuator plate disposed above the outside surface of the housing and secured to the shaft of the ratchet pawl body for co-rotation with the shaft and the ratchet pawl body, the actuator plate having a pin-insertion hole of a diameter smaller than the pin-accommodating hole, the actuator plate being manually movable about the axis of the shaft in opposite directions between a locking position in which the pin-insertion hole is in substantial alignment with the pin-accommodating hole and the engagement between the ratchet pawl and the ratchet teeth is maintained, and a releasing position in which the pin-insertion hole is out of alignment with the pin-accommodating hole, and the ratchet pawl is released from interlocking engagement with the ratchet teeth against the force of the ratchet pawl spring, a stopper pin removably inserted into the pin-accommodating hole either through the pin-insertion hole to keep the actuator plate in the locking position, or alternatively directly, with an outer edge of the actuator plate being in contact with the stopper pin, to keep the actuator plate in the releasing position.

In the ratchet tensioner of the foregoing constitution, the actuator plate is rotated to maintain interlocking engagement between the ratchet pawl and the ratchet tooth, so that the stopper pin is inserted into a pin-inserting hole of the actuator plate and a pin-accommodating hole of the housing, thereby maintaining the plunger in its engaged state. The plunger is prevented from moving forward in the projecting direction. When the actuator plate is rotated to disengage the ratchet pawl from the ratchet tooth, the stopper pin contacts with an outside end surface of the actuator plate and fitted into the pin-accommodating hole of the housing, thereby allowing the plunger to project from the housing or simultaneously maintaining the plunger to be pushed into the housing.

BRIEF DESCRIPTION OF THE DRAWINGS

The above objects, other objects, features and advantages of the present invention will be better understood from the following description taken in conjunction with the accompanying drawings, in which.

DETAILED DESCRIPTION OF THE PREFERRED EMBODIMENT

Now, a preferred embodiment of the present invention will be described in detail with reference to FIGS. 1 to 4.

Figure 6:
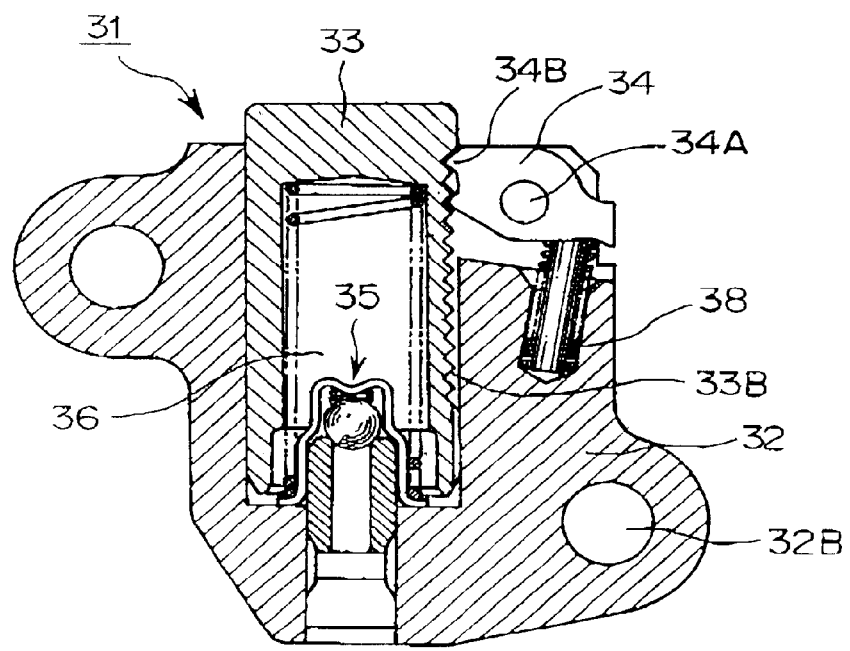
FIG. 6 is a cross-sectional view of the ratchet tensioner shown in FIG. 5.
Figure 7:
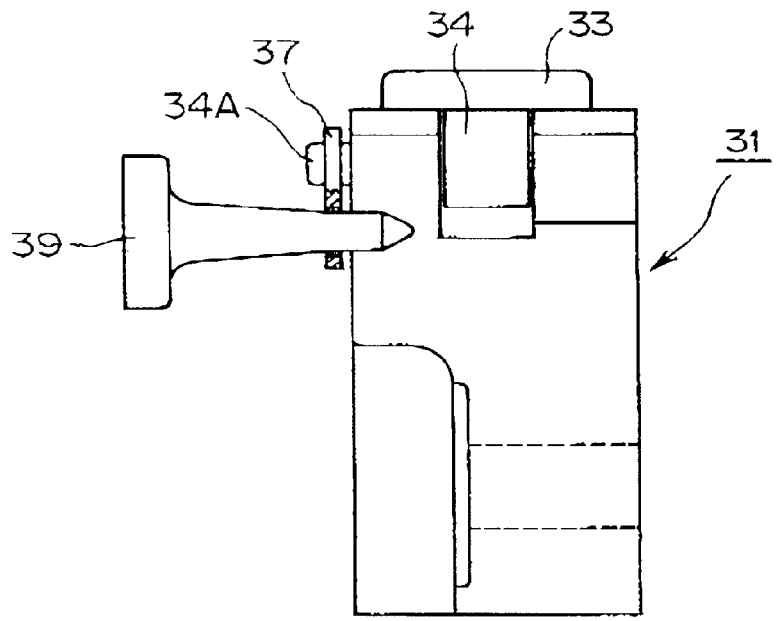
FIG. 7 is a side view of the ratchet tensioner shown in FIG. 5 when a plunger is in its engaged state.
Figure 8:
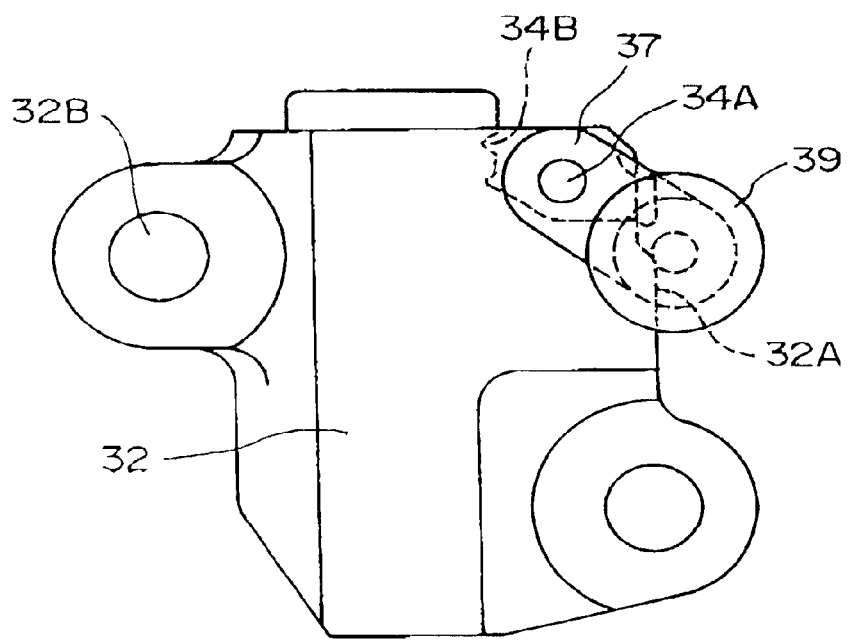
FIG. 8 is a front view of the ratchet tensioner shown in FIG. 5 when the plunger is in its engaged state.
Figure 9:
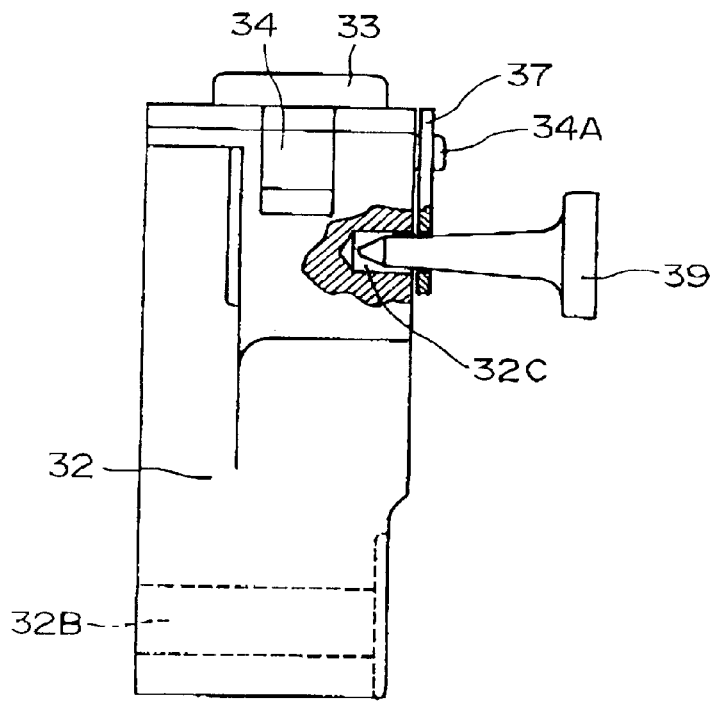
FIG. 9 is a partially cut away side view showing another example of a conventional ratchet tensioner.
Figure 10:
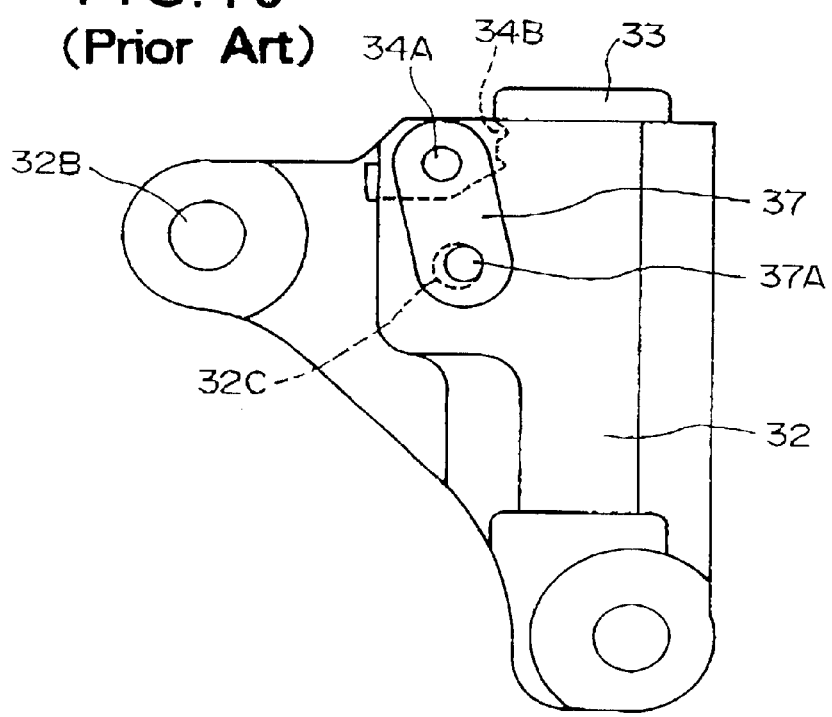
FIG. 10 is a front view of the ratchet tensioner shown in FIG. 9 when a plunger is in its engaged state.

As shown in these figures, a ratchet tensioner 1 embodying the present invention comprises a housing 2, and a plunger 3 retractably mounted in the housing with its one end protecting outward from the housing 2, the plunger 3 being urged by a plunger spring (not shown but identical to the one 36 shown in FIG. 6) in a direction projecting outward from the housing 2. The tensioner 1 further has a ratchet pawl body 4 pivotally mounted by a shaft 4A to the housing 2. The ratchet pawl body 4 has a ratchet pawl 4B at one end thereof urged by a ratchet pawl spring (not shown but identical to the one 38 shown in FIG. 6) to engage a series of ratchet teeth 3B (partly shown in FIG. 2) formed on an outer periphery of the plunger 3, so that a backward displacement of the plunger 3 is suppressed. Reference numeral 2A in above respective figures indicates a mounting hole for mounting the ratchet tensioner 1 to an engine. Furthermore, since the essential structure of the ratchet tensioner 1 is the same as that of the aforementioned conventional ratchet tensioner 31, the detailed structure, operation, function etc. thereof will be omitted.

The ratchet tensioner 1 includes a mechanism for locking and releasing the plunger 3 with respect to the ratchet pawl 4B. The plunger locking and releasing mechanism an actuator plate 5 secured to the shaft 4A of the ratchet pawl body projecting outside the housing 2, and a pin-accommodating hole 6 of large diameter formed in an outside surface of the housing 2. The actuator plate 5 is disposed above the outside surface in which the pin-accommodating hole 6 is formed. The actuator plate 5 has a pin-insertion hole 5A for receiving a stopper pin 7, the pin-insertion hole 5a having a diameter smaller than the diameter of the pin-accommodating hole 6. Especially, the diameter of the pin-accommodating hole 6 is larger than that of the pin-inserting hole 5A of the actuator plate 5 and smaller than the width of the actuator plate 5. In this case, the pin-accommodating hole 6 is preferably formed in the housing 2 across a recessed portion formed in the housing 2 for receiving therein the ratchet pawl body 4. Here, since both the actuator plate 5 and the ratchet pawl body 4 are secured to the shaft 4A of the ratchet pawl body, if the actuator plate 5 is rotated in one direction, the ratchet pawl body 4 is also rotated in the same direction. Thus, the actuator plate 5 is manually rotatable about the axis of the shaft 4A between a locking position in which the pin-inserting hole 5A in the plate 5 is in substantial alignment with the pin-accommodating hole 6 in the housing 2, and the ratchet pawl 4B is kept in interlocking engagement with the ratchet teeth 3B on the plunger 3, and a releasing position in which the pin-inserting hole 5A in the plate 5 is out of alignment with the pin-accommodating hole 6 in the housing 2, and the ratchet pawl 4B is released from interlocking engagement with the ratchet teeth 3B on the plunger 3 against the force of the non-illustrated ratchet pawl spring.

Figure 1:
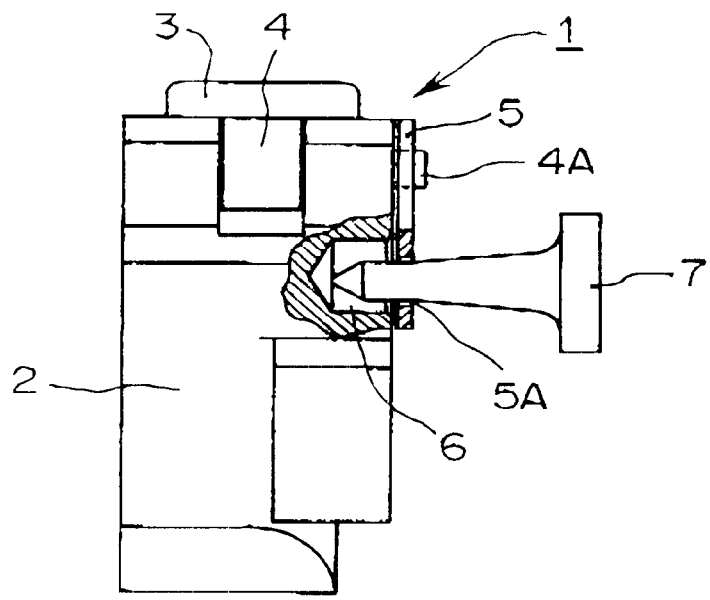
FIG. 1 is a partially cut-away side view of a ratchet tensioner according to an embodiment of the invention.
Figure 2:
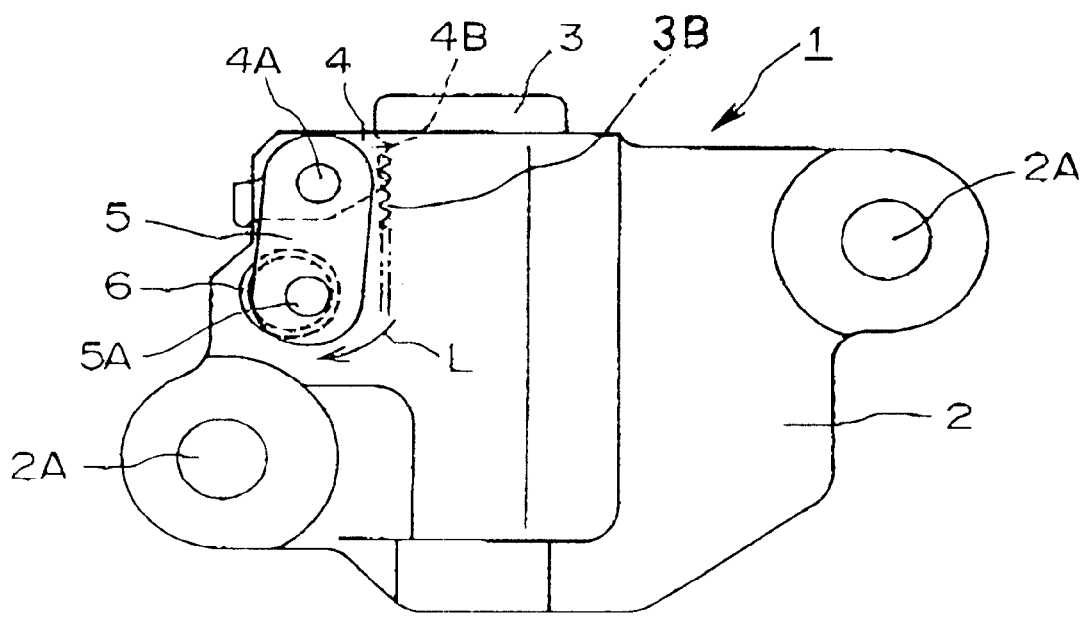
FIG. 2 is a front view of the ratchet tensioner shown in FIG. 1 when a plunger is in its engaged state.

FIG. 2 shows the tensioner 1 with the plunger 3 in a locking state or condition (shipping mode) in which the plunger 3 is fully retracted into the housing 2 and kept in interlocking engagement with the ratchet teeth 3B of the plunger 3 in preparation for shipping or attachment to an engine. In this condition, the actuator plate 5 has been turned from a normal operating condition shown in FIG, 3 in the direction of arrow L to assume a locking position in which interlocking engagement between the ratchet pawl 4B and the ratchet tooth 3B on the plunger 3 is maintained and the pin-inserting hole 5A is brought into substantial alignment with the pin-accommodating hole 6 of the housing 2. The stopper pin 7 is inserted through the pin-inserting hole 5A into the pin-accommodating hole 6 to thereby keep the actuator plate 5 in the locking position. In this instance, a tip end portion of the stopper pin 7 is in contact with an edge of the pin-accommodating hole 6, so that the actuator plate 5 is prevented from rotating in a reverse direction indicated by the arrow L, thereby keeping the plunger 3 in its locking position.

Figure 3:
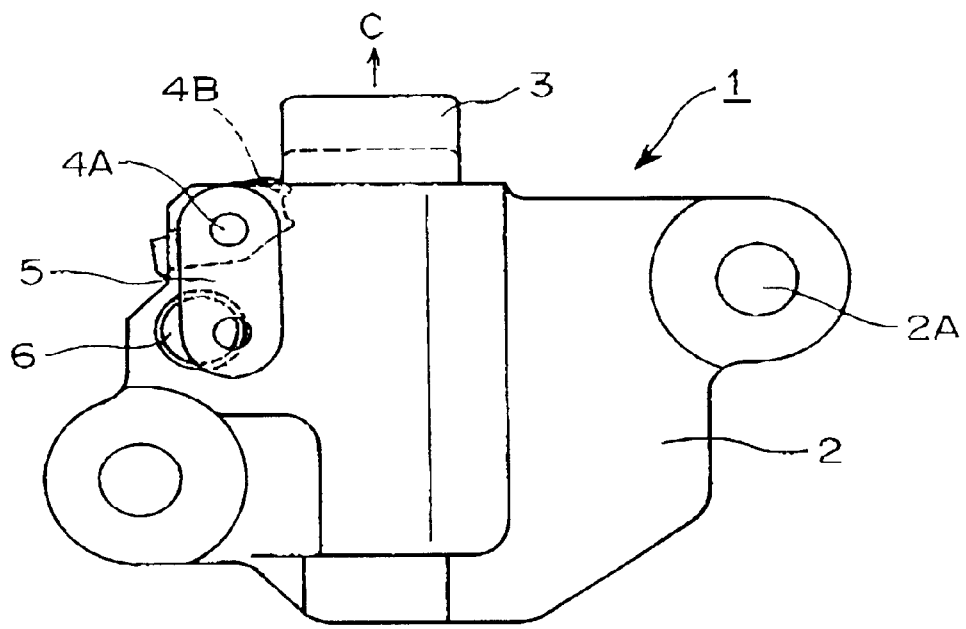
FIG. 3 is a front view of the ratchet tensioner shown in FIG. 1 during the operation.

FIG. 3 shows the tensioner 1 with the plunger in an operating state or condition (operating mode) in which the stopper pin 7 is removed and the actuator plate 5 in its free state. Accordingly, the ratchet pawl body 4 is used by the ratchet pawl spring (not shown) in a direction to move the ratchet pawl 4b into interlocking engagement with the ratchet teeth 3B on the plunger 3, and the plunger 3 is urged by the spring in the projecting direction, so that the plunger 3 is able to advance to take up a slack caused due to elongation of a belt or chain. Namely, when an elongation of the belt or chain occurs, the plunger 3 urged by the plunger spring moves forwards, and oil is supplied from outside into a hollow interior (not illustrated) in the plunger 3, and at the same time, engagement of the ratchet pawl 4B with the ratchet teeth 3B of the plunger 3 is displaced by one tooth pitch. Thus, the plunger 3 becomes projected in the direction of arrow C following the elongation of the belt or chain.

Figure 4:
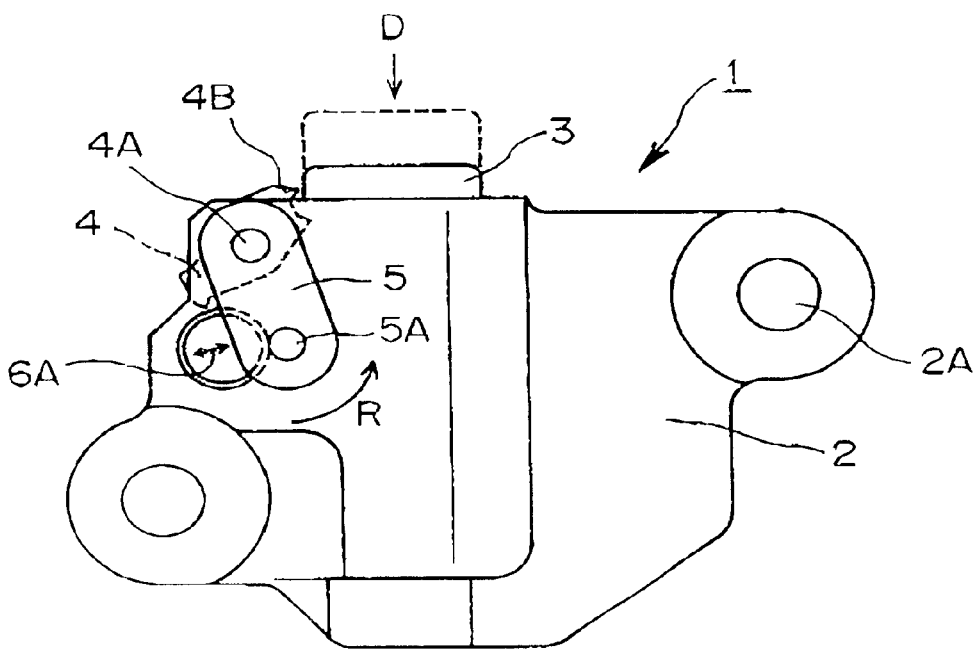
FIG. 4 is a front view of the ratchet tensioner shown in FIG. 1 when the plunger is in its disengaged state.
Figure 5:
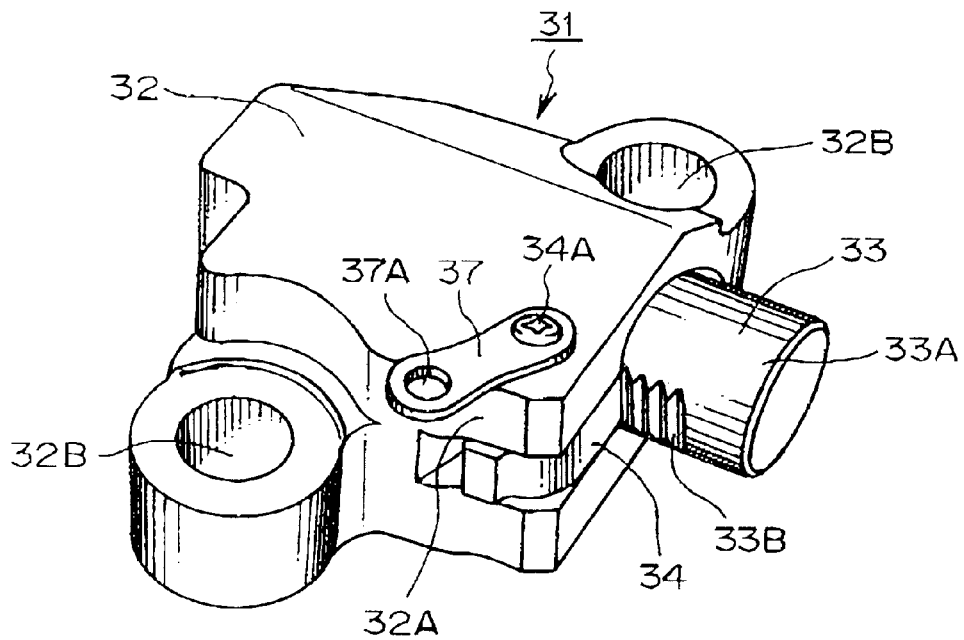
FIG. 5 is a perspective view showing an example of a conventional ratchet tensioner.

FIG. 4 shows the tensioner 1 with the plunger 3 in a released state or condition (releasing mode) in which the plunger 3 having been projected can be pushed into the housing 2 against the force of the non-illustrated plunger spring when the engine is to be repaired or the chain is to be attached or detached. In this condition, the actuator plate 5 has been manually turned in the direction of arrow R to assume a releasing position in which the pin-inserting hole 5A is off center or out of alignment with the pin-accommodating hole 6 in the housing 2 with a side edge of the actuator plate 5 extending across the pin-accommodating hole 6, and the ratchet pawl 4 is released from interlocking engagement with the ratchet teeth 3B against the force of the ratchet pawl spring (not shown). The stopper pin 7 is inserted in the pin-accommodating hole 6 through a gap or opening 6A defined between the side edge of the actuator plate 5 and an inner peripheral edge of the pin-accommodating hole 6. The side edge of the actuator plate 5 is held in abutment with an outer peripheral surface of the stopper pin 7 by the force of the non-illustrated ratchet pawl spring. By thus inserting the stopper pin 7 into the pin-accommodating hole 6, the actuating plate 5 is held in the releasing position, thereby keeping the plunger 3 free from interlocking engagement with the ratchet pawl 4B. Here, with the stopper pin 7 removed from the pin-accommodating hole 6, the plunger 3 is manually forced into the housing 2, and the actuator plate 5 is turned in the direction to engage the ratchet pawl 4B with the ratchet teeth 3B. Then, the pin-inserting hole 5A in the actuator plate 5 is in substantial alignment with the pin-accommodating hole 6, and the stopper pin 7 is inserted through the pin-insertion hole 5A into the pin-accommodating hole 6 to thereby keep the interlocking engagement between the ratchet pawl 4B and the ratchet teeth 3B on the plunger 3. With this operation, it is possible to loosen the belt or chain for facilitating attachment and detachment of the belt or chain relative to pulleys or sprockets.

In the above embodiment, the invention has been described as being embodied in a ratchet tensioner externally supplied with oil. However, the invention should by no means be limited to the illustrated embodiment but may be applied to any type of ratchet tensioner with a ratchet mechanism, such as an oil-sealing ratchet tensioner (so called "an auto-tensioner"), or a backlash-free ratchet tensioner. Furthermore, the stopper pin is preferably a conical shape, and may include a round pin, a tip of a (− or +) screwdriver etc. The shape of the stopper pin is not limited specifically.

The present invention constituted as above has advantages as follows.

The ratchet tensioner has a plunger locking and releasing mechanism comprised of a pin-accommodating hole formed in an outside surface of a housing, an actuator plate secured to a shaft of a ratchet pawl body for co-rotation of the ratchet pawl body above the outside surface of the housing, the actuator plate has a pin-inserting hole, and a stopper pin removably inserted into the pin-accommodating hole either directly, or alternately through the pin-insertion hole. The actuator plate is capable of being manually turned about the axis of the shaft of the rachet pawl body between a locking position in which the pin-inserting hole is in substantial alignment with the pin-accommodating hole and the interlocking engagement between the ratchet pawl and the ratchet teeth is maintained, and a releasing position in which the pin-insertion hole is out of alignment with the pin-accommodating hole and the ratchet pawl is released from interlocking engagement with the ratchet teeth on the plunger against the force of the ratchet pawl spring. By inserting the stopper pin through the pin-inserting hole into the pin-accommodating hole, the actuator plate is held in the locking position to thereby keep the interlocking engagement between the ratchet pawl and the ratchet teeth on the plunger. Alternatively, when the stopper pin is directly inserted in the pin-accommodating hole with a side edge of the actuating plate being in abutment with an outer peripheral surface of the stopper pin, the actuator plate is held in the releasing position to thereby keep the ratchet pawl out of engagement with the ratchet teeth on the plunger.

Additionally, it is possible to maintain the plunger in its released state by rotating the actuator plate in a reverse direction to disengage the ratchet pawl from the ratchet tooth so that the stopper pin is brought into contact with the side edge of the actuator plate and simultaneously fitted into the pin-accommodating hole of the housing. When the engine is to be repaired, the plunger serving as a one-way mechanism can be forced into the housing and locked in a desired position relative to the housing merely by turning the actuator plate followed by insertion into the pin-accommodating hole. It is, therefore, possible to improve the efficiency of the chain attaching and detaching operation and the engine maintenance work. The plunger releasing operation may be achieved by inserting the tip of a screwdriver through a small aperture such as a service hole provided in the engine.

Moreover, the plunger locking and releasing mechanism does not incur additional cost because the number of components and the position to be machined are substantially the same as those of the conventional ratchet tensioner with a plunger locking mechanism.

Obviously, various minor changes and modifications of the present invention are possible in the light of the above teaching. It is therefore to be understood that within the scope of the appended claims, the present invention may be practiced otherwise than as specifically described.

What is claimed is:

1. A ratchet tensioner comprising:
   a housing;
   a plunger retractably mounted in the housing with one end projecting outward from the housing, the plunger having a series of ratchet teeth formed on an outer peripheral surface thereof;
   a plunger spring acting between the housing and the plunger and urging the plunger in a direction to project outward from the housing;
   a ratchet pawl body pivotally mounted by a shaft to the housing, the ratchet pawl body having a ratchet pawl formed at one end of the ratchet pawl body;
   a ratchet pawl spring acting between the housing and the ratchet pawl body and urging the ratchet pawl body to turn about the axis of the shaft in a direction to engage the rachet pawl with the ratchet teeth on the plunger, thereby preventing the plunger from moving backward; and a plunger locking and releasing mechanism for selectively locking and releasing the plunger with respect to the ratchet pawl, the plunger locking and releasing mechanism having a large pin-accommodating hole formed in an outside surface of the housing, and having an inner peripheral edge, an actuator plate disposed above the outside surface of the housing and secured to the shaft of the ratchet pawl body for co-rotation with the shaft and the ratchet pawl body, the actuator plate having a small pin-insertion hole of a diameter smaller than the large pin-accommodating hole, said plate having a width greater than the diameter of said large pin-accommodating hole, and an outer edge spaced from the small pin-insertion hole, the actuator plate being manually movable about the axis of the shaft in opposite directions between a locking position in which the pin-insertion hole is in substantial alignment with the pin-accommodating hole and the engagement between the ratchet pawl and the ratchet teeth is maintained, an operating condition in which the pin-insertion hole is free to pass from alignment with said pin-accommodating hole and said outer edge is free to pass toward but not beyond said inner peripheral edge of said pin-accommodating hole, and a releasing position in which the pin-insertion hole is out of alignment with the pin-accommodating hole and said outer edge is close to but not beyond said pin-accommodating hole, and the ratchet pawl is released from interlocking engagement with the ratchet teeth against the force of the ratchet pawl spring, said pin-accommodating hole being sufficiently larger than said pin-insertion hole, so that said inner peripheral edge extends beyond said outer edge in each of said locking and releasing positions and said operating condition, a stopper pin having a diameter no greater than the diameter of the small pin-insertion hole and operable to be inserted into the large pin-accommodating hole either through the small pin-insertion hole to keep the actuator plate in said locking positions the diameter of the large pin-accommodating hole allowing limited movement of said actuator plate when said stopper pin is inserted through said small pin-insertion hole into said large pin-accommodating hole, or alternatively inserted into the large pin-accommodating hole directly through a gap defined between said inner peripheral edge of the pin-accommodating hole and said outer edge of the actuator plate, with said outer edge of the actuator plate being in contact with the stopper pin, the spacing of said outer edge from the small pin-insertion hole being sufficiently great to keep the actuator plate in said releasing position, removal of the pin from the large pin-accommodating hole operable to free the actuator plate for movement in said operating condition between said locking position and said releasing position under the bias of said ratchet pawl spring.

2. A ratchet tensioner according to claim 1 wherein said stopper pin has a tip of conical shape for forcible insertion through the gap defined between the inner peripheral edge of the pin-accommodating hole and said outer edge of the actuator plate, and a body portion which keeps the actuator plate in said locking position.

* * * * *

UNITED STATES PATENT AND TRADEMARK OFFICE
CERTIFICATE OF CORRECTION

PATENT NO.   : 6,612,951 B2
DATED        : September 2, 2003
INVENTOR(S)  : Kurohata It is certified that error appears in the above-identified patent and that said Letters Patent is hereby corrected as shown below:

<u>Column 8,</u>
Line 10, "locking positions the" should be -- locking position, the --.

Signed and Sealed this

Second Day of December, 2003

JAMES E. ROGAN
*Director of the United States Patent and Trademark Office*